(12) United States Patent
Rowe et al.

(10) Patent No.: US 11,097,828 B2
(45) Date of Patent: Aug. 24, 2021

(54) SHROUD

(71) Applicant: Dotterel Technologies Limited, Auckland (NZ)

(72) Inventors: Samuel Seamus Rowe, Auckland (NZ); Matthew Rowe, Auckland (NZ); Aidan Clarke, Auckland (NZ)

(73) Assignee: Dotterel Technologies Limited, Auckland (NZ)

( * ) Notice: Subject to any disclaimer, the term of this patent is extended or adjusted under 35 U.S.C. 154(b) by 0 days.

(21) Appl. No.: 16/632,223

(22) PCT Filed: Jul. 23, 2018

(86) PCT No.: PCT/NZ2018/050101
§ 371 (c)(1),
(2) Date: Jan. 17, 2020

(87) PCT Pub. No.: WO2019/022618
PCT Pub. Date: Jan. 31, 2019

(65) Prior Publication Data
US 2020/0164962 A1 May 28, 2020

(30) Foreign Application Priority Data

Jul. 24, 2017 (NZ) ........................................ 733955

(51) Int. Cl.
*B64C 1/40* (2006.01)
*B32B 27/06* (2006.01)
(Continued)

(52) U.S. Cl.
CPC .............. *B64C 1/40* (2013.01); *B32B 27/065* (2013.01); *B32B 27/12* (2013.01); *B32B 27/18* (2013.01);
(Continued)

(58) Field of Classification Search
CPC ................. B64C 11/001; B64C 39/024; B64C 2201/162; B32B 27/12; B32B 27/18; B32B 27/065; B32B 2603/00; B32B 2307/102
See application file for complete search history.

(56) References Cited

U.S. PATENT DOCUMENTS 2,988,302 A 6/1961 Smith
3,508,838 A 4/1970 Martenson
(Continued)

FOREIGN PATENT DOCUMENTS

CA 2651433 A1 7/2009
CN 2361699 Y 2/2000
(Continued)

OTHER PUBLICATIONS

Foreign Communication from a Related Counterpart Application, International Search Report and Written Opinion dated Nov. 20, 2018, International Application No. PCT/NZ2018/050101 filed on Jul. 23, 2018.
(Continued)

*Primary Examiner* — Valentina Xavier

(57) ABSTRACT

A shroud for an aircraft configured to at least partially surround a noise source including a propeller. The shroud includes an outer layer and two or more sound absorbing materials located inside the shroud. The outer layer is configured to transmit noise from the noise source into the inside of the shroud and/or includes a recess located and sized to partially surround at least a part of a tip of at least one blade.

20 Claims, 15 Drawing Sheets

(51) Int. Cl.
  *B32B 27/12* (2006.01)
  *B32B 27/18* (2006.01)
  *B64C 11/00* (2006.01)
  *B64C 39/02* (2006.01)

(52) U.S. Cl.
  CPC .......... *B64C 11/001* (2013.01); *B64C 39/024* (2013.01); *B32B 2307/102* (2013.01); *B32B 2603/00* (2013.01); *B64C 2201/162* (2013.01)

(56) References Cited

U.S. PATENT DOCUMENTS

| | | |
|---|---|---|
| 3,779,338 A | 12/1973 | Hayden et al. |
| 3,890,060 A | 6/1975 | Lipstein |
| 3,913,702 A | 10/1975 | Wirt et al. |
| 3,937,590 A | 2/1976 | Mani |
| 4,104,002 A | 8/1978 | Enrich |
| 4,358,246 A | 11/1982 | Hanson et al. |
| 4,410,065 A | 10/1983 | Harvey |
| 4,508,486 A | 4/1985 | Tinker |
| 5,025,888 A | 6/1991 | Arcas et al. |
| 5,150,857 A | 9/1992 | Moffitt et al. |
| 5,152,478 A | 10/1992 | Cycon et al. |
| 5,405,243 A | 4/1995 | Hurley et al. |
| 5,423,658 A | 6/1995 | Pia et al. |
| 5,478,199 A | 12/1995 | Gliebe |
| 5,543,198 A | 8/1996 | Wilson |
| 5,601,410 A | 2/1997 | Quinlan |
| 5,620,304 A | 4/1997 | Matsuka et al. |
| 5,789,678 A | 8/1998 | Pla |
| 5,808,243 A | 9/1998 | McCormick et al. |
| 6,270,038 B1 | 8/2001 | Cycon et al. |
| 6,502,787 B1 | 1/2003 | Barrett |
| 6,654,467 B1 | 11/2003 | York et al. |
| 6,698,685 B2 | 3/2004 | Walmsley |
| 6,827,180 B2 | 12/2004 | Wilson |
| 6,866,475 B2 | 3/2005 | Rivers |
| 7,032,861 B2 * | 4/2006 | Sanders, Jr. ............ B64C 27/12 244/12.1 |
| 7,080,712 B2 | 7/2006 | Tsuiki et al. |
| 7,181,891 B2 | 2/2007 | Surace et al. |
| 7,510,052 B2 | 3/2009 | Ayle |
| 7,510,142 B2 | 3/2009 | Johnson |
| 7,520,466 B2 | 4/2009 | Bostan |
| 7,540,354 B2 | 6/2009 | Morin et al. |
| 7,712,701 B1 | 5/2010 | Ehrmantraut et al. |
| 7,841,563 B2 | 11/2010 | Goossen et al. |
| 7,850,116 B2 | 12/2010 | Stuhr |
| 8,070,092 B2 | 12/2011 | Bouldin et al. |
| 8,123,460 B2 | 2/2012 | Collette |
| 8,240,597 B2 | 8/2012 | Entsminger et al. |
| 8,328,130 B2 | 12/2012 | Goossen |
| 8,708,093 B2 | 4/2014 | Fisk et al. |
| 9,266,602 B2 | 2/2016 | Kreitmair-Steck et al. |
| 9,442,496 B1 | 9/2016 | Beckman et al. |
| 9,457,901 B2 | 10/2016 | Bertrand et al. |
| 9,474,265 B2 | 10/2016 | Duncan et al. |
| 9,476,385 B2 | 10/2016 | Moore et al. |
| 9,489,937 B1 | 11/2016 | Beard et al. |
| 10,017,249 B1 | 7/2018 | Tseng et al. |
| 2003/0235495 A1 * | 12/2003 | Rivers .................. B64C 11/001 415/173.3 |
| 2004/0066940 A1 | 4/2004 | Amir |
| 2005/0082421 A1 | 4/2005 | Perlo et al. |
| 2005/0127239 A1 | 6/2005 | Srivastava |
| 2005/0271221 A1 | 12/2005 | Cerwin |
| 2006/0049304 A1 | 3/2006 | Sanders et al. |
| 2006/0231675 A1 | 10/2006 | Bostan |
| 2007/0272796 A1 * | 11/2007 | Stuhr .................. B64D 27/12 244/54 |
| 2008/0173497 A1 | 7/2008 | Kalinova et al. |
| 2009/0297357 A1 | 12/2009 | Ali |
| 2010/0108809 A1 | 5/2010 | Bouldin et al. |
| 2010/0143151 A1 | 6/2010 | Kinzie et al. |
| 2010/0175362 A1 | 7/2010 | Stranska et al. |
| 2011/0001017 A1 | 1/2011 | Burdisso |
| 2011/0133025 A1 | 6/2011 | Vauchel et al. |
| 2012/0012523 A1 | 1/2012 | Canonico et al. |
| 2012/0125710 A1 | 5/2012 | Fisk et al. |
| 2012/0315159 A1 | 12/2012 | Fisk et al. |
| 2013/0140649 A1 | 6/2013 | Rogers et al. |
| 2013/0163774 A1 | 6/2013 | Maeda |
| 2014/0133964 A1 | 5/2014 | Ayle |
| 2015/0000252 A1 | 1/2015 | Moore et al. |
| 2015/0056058 A1 | 2/2015 | Grissom et al. |
| 2015/0175258 A1 | 6/2015 | Lee |
| 2016/0039529 A1 | 2/2016 | Buchmueller et al. |
| 2016/0063987 A1 | 3/2016 | Xu et al. |
| 2016/0083073 A1 | 3/2016 | Beckman |
| 2016/0118033 A1 | 4/2016 | Owen, Jr. et al. |
| 2016/0318606 A1 * | 11/2016 | Rahrig .................. B64D 33/06 |
| 2016/0334327 A1 | 11/2016 | Potyrailo et al. |
| 2018/0148187 A1 * | 5/2018 | Valleroy ................ F02K 1/827 |
| 2018/0208302 A1 | 7/2018 | Schaube et al. |
| 2018/0257196 A1 | 9/2018 | Simpson et al. |
| 2018/0305004 A1 | 10/2018 | Rowe et al. |

FOREIGN PATENT DOCUMENTS

| | | | |
|---|---|---|---|
| CN | 101934858 A | 1/2011 | |
| CN | 102241166 A | 11/2011 | |
| CN | 101622174 B | 11/2012 | |
| CN | 205010491U A | 2/2016 | |
| CZ | 2005226 A3 | 11/2006 | |
| DE | 10104662 A1 | 8/2002 | |
| DE | 60033157 T2 | 11/2007 | |
| DE | 102007046253 A1 | 4/2008 | |
| DE | 102007019762 A1 | 10/2008 | |
| EP | 0716272 B1 | 1/2000 | |
| EP | 1117588 A1 | 7/2001 | |
| EP | 1228958 A2 | 8/2002 | |
| EP | 1310658 A2 | 5/2003 | |
| EP | 1482478 A2 * | 12/2004 | .......... G10K 11/175 |
| EP | 2058226 A1 | 5/2009 | |
| EP | 2147859 A2 | 1/2010 | |
| EP | 2334557 B1 | 10/2012 | |
| EP | 1673279 B1 | 7/2013 | |
| EP | 2706009 A1 | 3/2014 | |
| EP | 2793043 A1 | 10/2014 | |
| EP | 3366586 A1 | 8/2018 | |
| ES | 2289445 T3 | 2/2008 | |
| FR | 2871136 A1 | 12/2005 | |
| GB | 2252078 A | 7/1992 | |
| JP | 5500453 B2 | 5/2014 | |
| KR | 1169742 BI | 7/2012 | |
| KR | 1663792 BI | 10/2016 | |
| RU | 2467191 C2 | 11/2012 | |
| RU | 2594657 C2 | 8/2016 | |
| WO | 2000064736 A1 | 11/2000 | |
| WO | 2005072233 A2 | 8/2005 | |
| WO | 2005125267 A2 | 12/2005 | |
| WO | 2006066561 A1 | 6/2006 | |
| WO | 2010003988 A1 | 1/2010 | |
| WO | 2012110267 A1 | 8/2012 | |
| WO | 2014007883 A1 | 1/2014 | |
| WO | 2014066508 A2 | 5/2014 | |
| WO | 2014179225 A1 | 11/2014 | |
| WO | 2015103700 A1 | 7/2015 | |
| WO | 2016048897 A1 | 3/2016 | |
| WO | 2016057999 A1 | 4/2016 | |
| WO | 2016112124 A2 | 7/2016 | |
| WO | 2016190753 A1 | 12/2016 | |
| WO | 2017021628 A1 | 2/2017 | |
| WO | 2019022618 A1 | 1/2019 | |

OTHER PUBLICATIONS

Foreign Communication from a Related Counterpart Application, International Preliminary Report on Patentability dated Jun. 27, 2019, International Application No. PCT/NZ2018/050101 filed on Jul. 23, 2018.

(56) References Cited

OTHER PUBLICATIONS

Foreign Communication from a Related Counterpart Application, International Search Report and Written Opinion dated Sep. 16, 2016, International Application No. PCT/NZ2016/050087 filed May 25, 2016.
Foreign Communication from a Related Counterpart Application, International Preliminary Report dated Jul. 4, 2016, International Application No. PCT/NZ20161050087 filed May 25, 2016.
Martin, Theodore P., et al., "On the Use of Aerogel as a soft acoustic metamaterial for airborne sound", US Naval Research Laboratory, Sep. 28, 2015.
Rabbi, Amir, et al., "Incorporation of Nanofiber Layers in Nonwoven Materials for Improving Their Acoustic Properties", Journal of Engeered Fibers and Fabrics, vol. 8, Issue 4, 2013.
Kuczmarski, Maria, et al., "Acoustic Absorption in Porous Materials", NASA Center for Aerospace Information, Mar. 2011.
Office Action dated Jan. 31, 2020, U.S. Appl. No. 15/576,799, filed Nov. 24, 2017.

\* cited by examiner

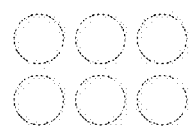
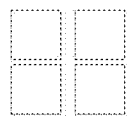
Figure 6A	Figure 6B
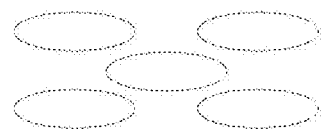
Figure 6C	Figure 6D
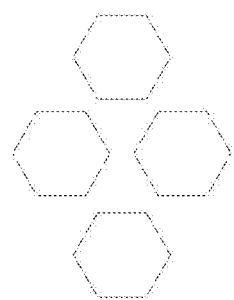
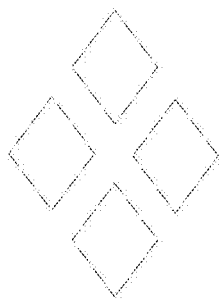
Figure 6E	Figure 6F

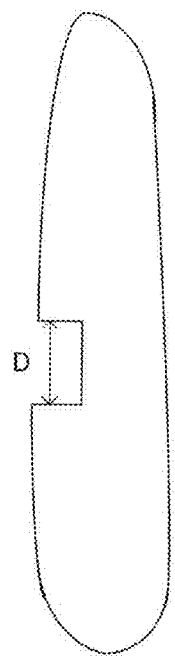
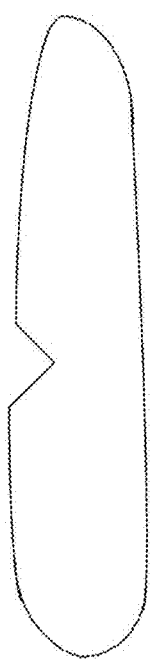
Figure 8A          Figure 8B
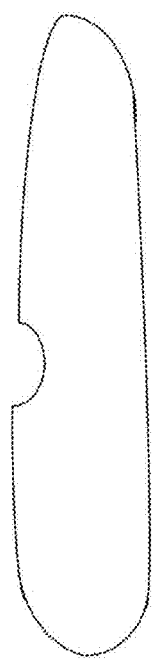
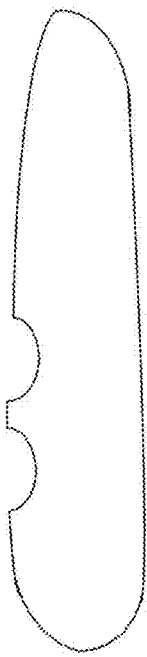
Figure 8C          Figure 8D          Figure 8E

| Material | g/m² |
|---|---|
| 5mm cork-rubber | 3455 |
| 42mm RockwoolS | 3182 |
| 24mm nexus foam | 818 |
| 0.7mm felt with epoxy | 795 |
| 35mm Glasswool | 545 |
| 1.3mm stiff felt | 432 |
| 13.5mm packing foam | 341 |
| 30mm melamine foam | 273 |
| 5mm Cotton Fiber sheet | 205 |

SHROUD

FIELD

The present invention relates to noise reduction. More particularly, but not exclusively, the invention relates to noise reducing shrouds.

BACKGROUND

Many aircraft, such as UAVs, helicopters, vertical lift systems and fixed-wing aircraft disadvantageously produce noise from their motors and propellers. As such, they may be a nuisance to the surrounding environment, adding to noise pollution.

Noise created by propellers is a particular problem for UAVs used for video and audio capture for filming. Current UAV audio capture for filming requires expensive and time-consuming post-processing to remove noise created by the UAVs.

Quieter UAVs are also desirable in a range of other applications, such as defence, conservation, and use in residential areas.

It is an object of the invention to provide an improved shroud or to at least provide the public or industry with a useful choice.

SUMMARY

According to one example embodiment there is provided a shroud for an aircraft configured to at least partially surround a noise source including a propeller, the shroud including two or more sound absorbing materials located inside the shroud.

According to a still further example embodiment there is provided a shroud for an aircraft configured to at least partially surround a noise source including a propeller, including: an outer layer; and at least one sound absorbing material inside the shroud, wherein the outer layer is configured to transmit noise from the noise source into the inside of the shroud.

According to a still further example embodiment there is provided a shroud for an aircraft configured to at least partially surround a noise source including a propeller, the shroud includes layers of sound absorbing materials located inside the shroud and an air gap between at least two of the layers.

According to a still further example embodiment there is provided a shroud for an aircraft configured to at least partially surround a noise source including a propeller, the shroud includes layers of sound absorbing materials located inside the shroud wherein at least one layer is a sound dampening adhesive.

According to a still further example embodiment there is provided a shroud for an aircraft configured to at least partially surround a noise source including a propeller having at least one blade, the shroud including an outer layer having a recess, wherein the recess is located and sized to partially surround at least a part of a tip of the at least one blade.

According to a still further example embodiment there is provided an aircraft comprising: at least one propeller; and a shroud according to any one of the preceding paragraphs.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art, validly combinable with other documents or that it forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention, in which:

FIGS. 6A-F are representations of various aperture shapes;

FIGS. 8A-E are cross sectional outlines of shrouds having different recess shapes;

DETAILED DESCRIPTION

The shrouds described below generally relate to cowlings, which at least partially surround an aircraft's motor and/or propeller assembly. The aircraft may be a UAV or VTOL aircraft. The propeller assembly may be a vertical lift propeller assembly. The shroud may help reduce noise, improve the efficiency of the aircraft, and/or provide a safety barrier around the motor and/or propeller.

Generally, the shroud may improve aircraft efficiency by ducting airflow and minimising vortices at the tip of the blades of the propeller. Minimising vortices helps minimise turbulent airflow, which reduces losses from the tips of the blades increasing lift/thrust. Various embodiments of shrouds are described below, which may reduce the noise of the aircraft by absorbing, diffusing and/or reflecting the noise that has been produced by the aircraft's motor and/or propeller assembly. This may reduce the noise of the aircraft at a distance from the aircraft (for example, the noise that can be detected at ground level by the aircraft's operator, members of the public, audio recording equipment remote from the aircraft and/or wildlife). This may also reduce the noise of the aircraft near the aircraft (for example, the noise that can be detected by audio recording equipment mounted on the aircraft). It will be understood that the term noise typically refers to unwanted sound. For the purposes of this specification, unless otherwise indicated, the terms noise and sound may be used interchangeably.

Sound absorption refers to the process by which a material, structure, or object takes in sound energy when sound waves are encountered, as opposed to reflecting the energy. Part of the absorbed energy is transformed into heat and part is transmitted through the absorbing body. Sound reflection refers to the process by which a material, structure, or object reflects sound energy when sound waves are encountered. Sound diffusion refers to the process by which a material, structure, or object redirects sound energy in multiple directions when sound waves are encountered.

Figure 1A:
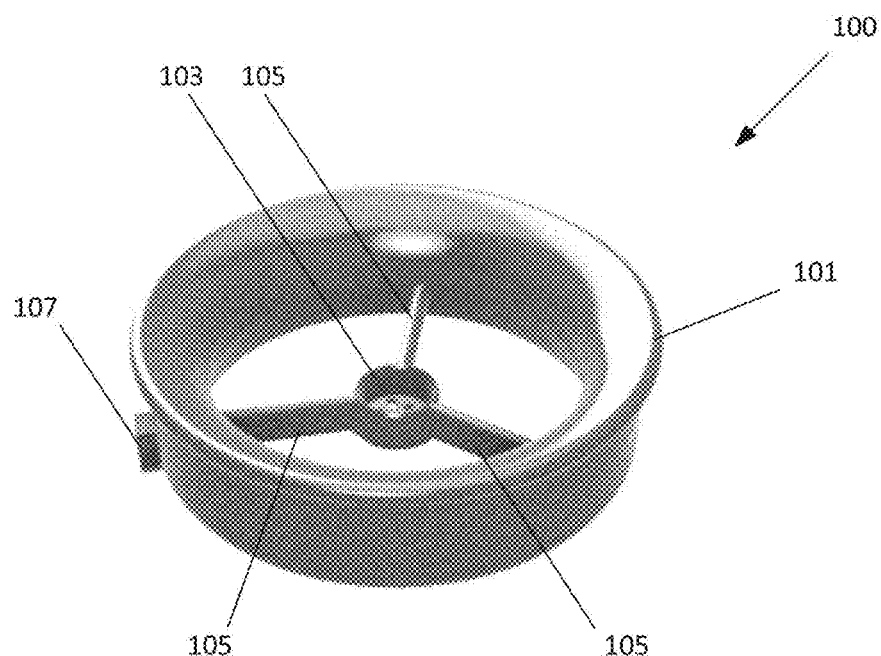
FIG. 1A is a perspective view of a shroud according to one example embodiment.

FIG. 1A is a perspective view of a shroud 100 according to one example embodiment. The shroud includes a shroud body 101 having an outer layer 102. The shroud generally surrounds the aircraft's motor and/or vertical lift propeller assemblies (not shown). As shown in FIG. 1A, the shroud may be connected to a central motor mount 103 by suitable struts 105. The struts are configured to attach the shroud to the aircraft, for example the struts may attach to the motor assembly, the structure holding the motor assembly or the body of the aircraft. Also shown in FIG. 1A is part of an arm 107, which connects to the remainder of the aircraft (for example, the body of an UAV).

Figure 1B:
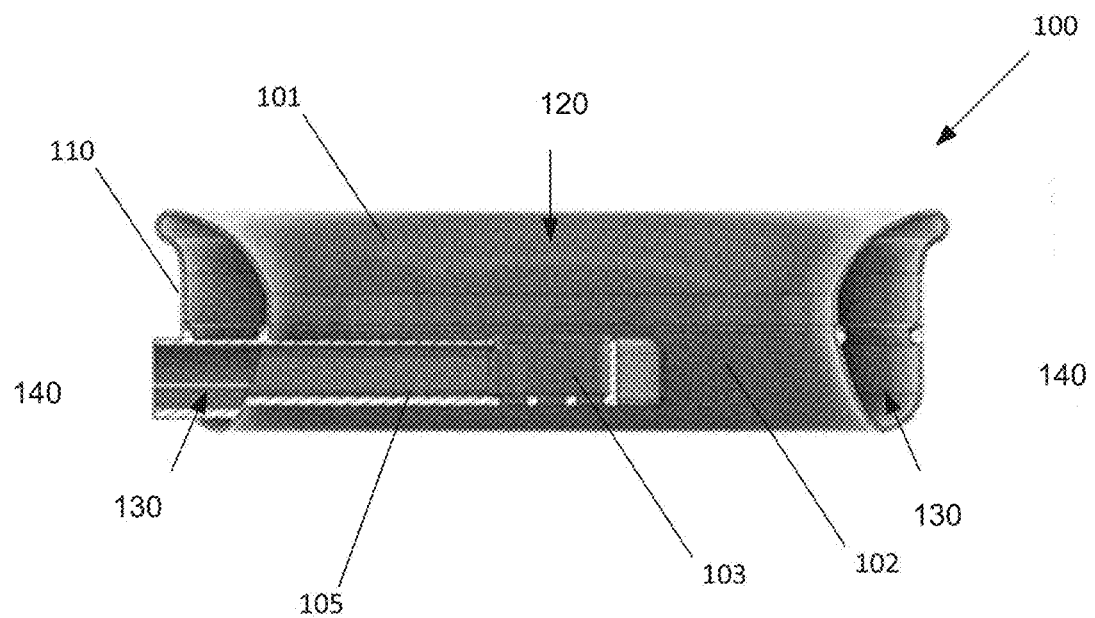
FIG. 1B is a cross sectional view of the shroud in FIG. 1A.

FIG. 1B is a cross-sectional view of the shroud 100 of FIG. 1A. The shroud body 101 includes an outer layer 102, having an interior facing layer 108 and an exterior facing layer 110. For the remainder of this specification, 'interior' will be used to refer to the space generally encompassed by the innermost surface of the shroud. The interior of the shroud is indicated in FIG. 1B by 120. The interior of the shroud will normally include at least part of the aircraft's motor and/or vertical lift propeller assembly (not shown in FIG. 1B) and the struts 105. The interior corresponds to the region through which the forced flow of air gives rise to thrust for the aircraft. For clarity, "inside" (as opposed to interior) will refer to the space within the shroud body 101. The inside of the shroud is indicated in FIG. 1B by 130. 'Exterior' will be used to refer to the space that is neither the interior of the shroud or the inside of the shroud. The exterior of the shroud is indicated in FIG. 1B by 140. Generally, the interior facing layer 108 surrounds the aircraft's motor and/or vertical lift propeller assembly, and thus the interior facing layer 108 faces the main noise source of the aircraft. Therefore, the interior facing layer may also be referred to as the 'noise source facing layer' or 'noise facing layer'.

Figure 2:
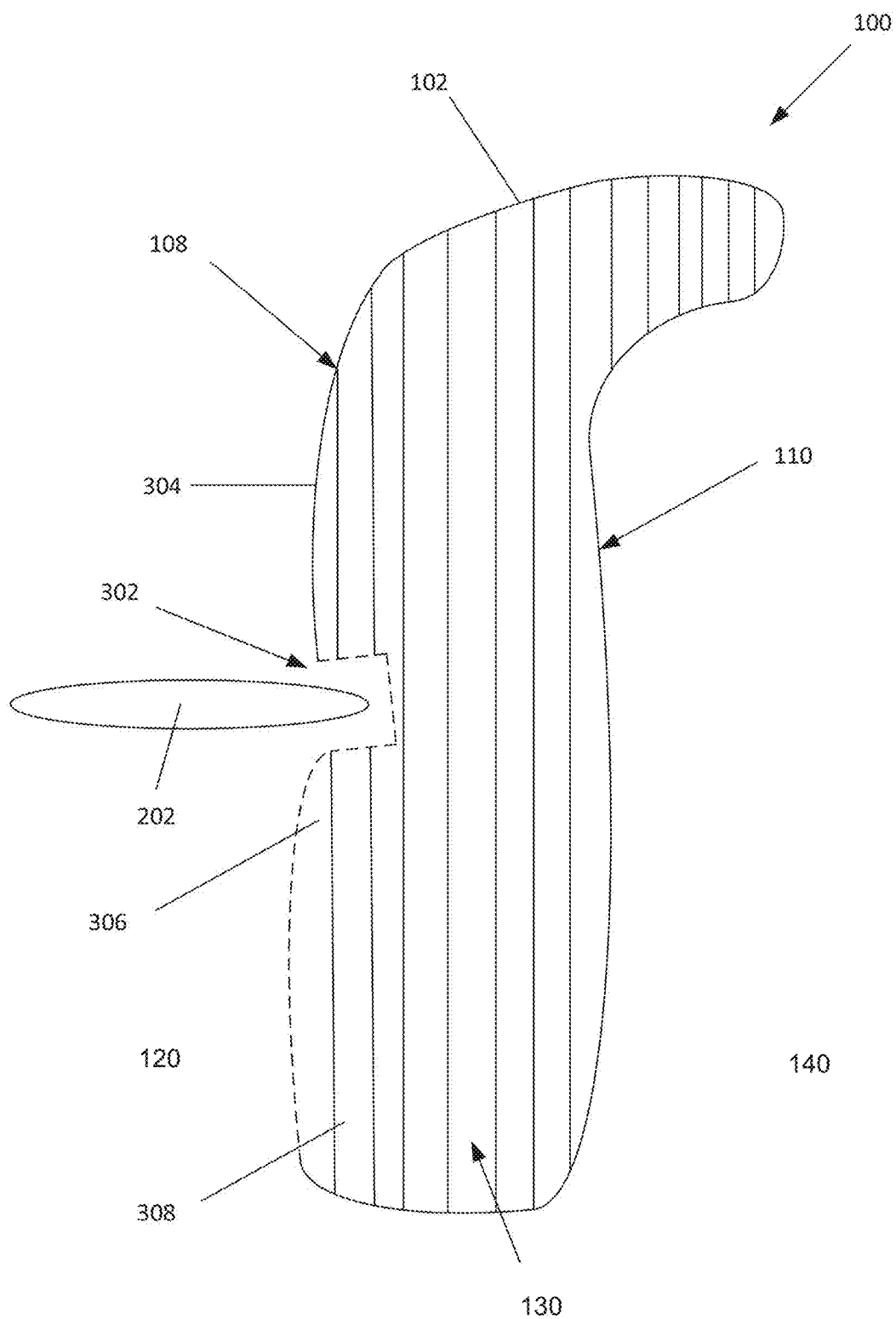
FIG. 2 is a profile view of a shroud according to one example embodiment.
Figure 3A:
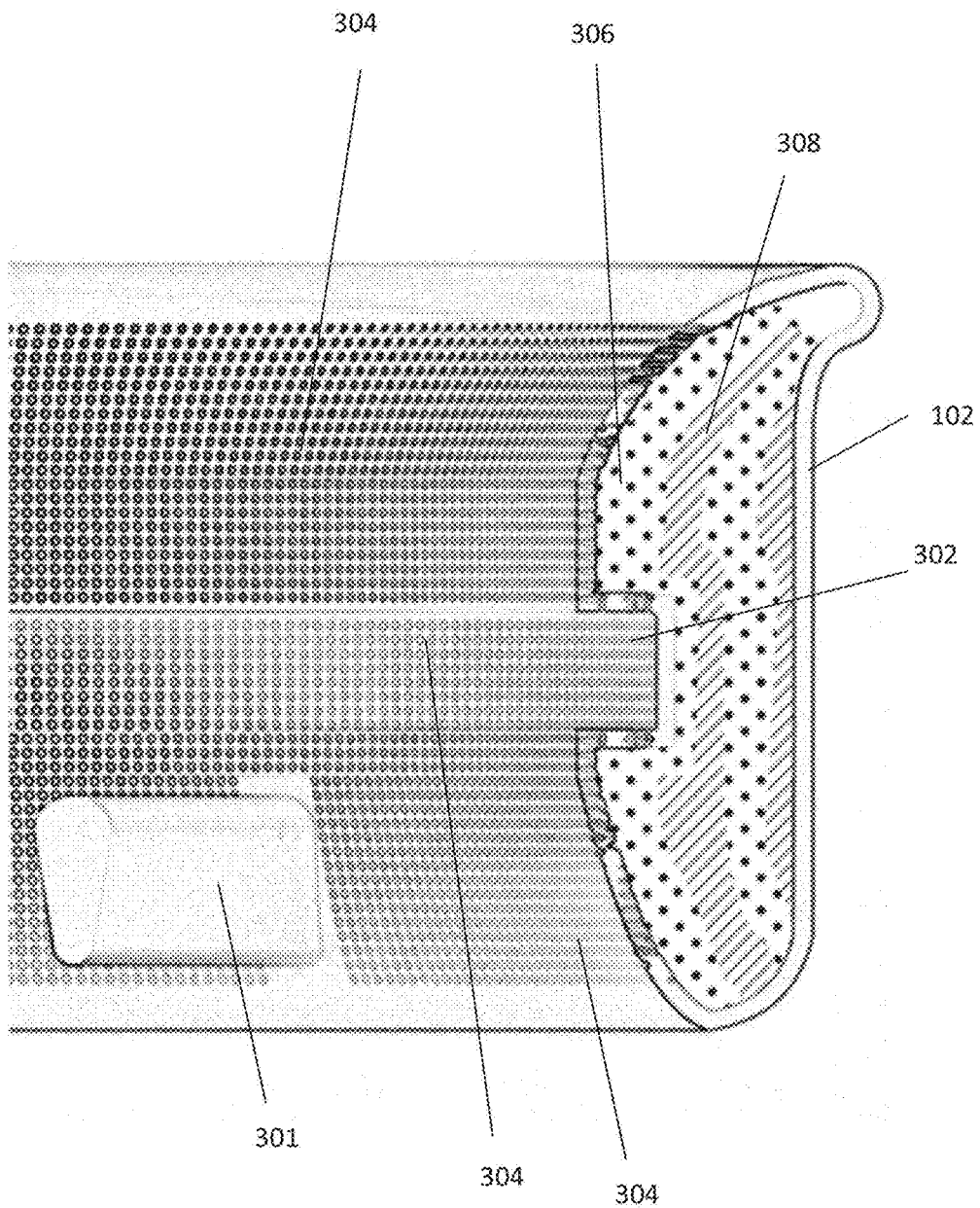
FIG. 3A is a cross sectional view of part of a shroud.

FIG. 2 illustrates the profile of a shroud 100 according to an example embodiment, including an outer layer 102 having an interior facing layer 108 and an exterior facing layer 110. The interior facing layer 108 may comprise apertures 304. Inside the outer layer 102 are layers of material 306 and 308. The outer layer 102 may be a rigid membrane or shell which at least partially surrounds and/or contains the layers of material 306 and 308. The interior facing layer 108 and the exterior facing layer 110 of FIGS. 1A and 1B are shown as contiguous (thereby giving rise to a unitary outer layer 102 in the form of a shell). As will be described in more detail below, the outer layer may comprise a distinct interior facing layer and a distinct exterior facing layer. In FIG. 2, the shroud includes layers of a first material 306 and a second material 308, configured in a repeating pattern. Sound from a propeller 202 passes through apertures 304 in the outer layer 102 and is absorbed by the layers of sound absorbing material 306 and 308. The shroud 100 may include a recess 302 which may partially surround the tip of the blades of the propeller 202. FIG. 3A is a cross-sectional view of part of a shroud 100.

Inner Material of Shroud

Figure 3B:
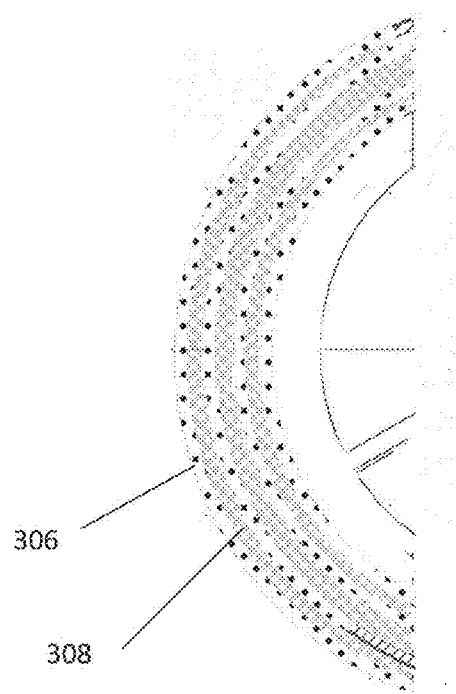
FIG. 3B is a planar cross sectional view of the shroud of FIG. 3A.
Figure 3C:
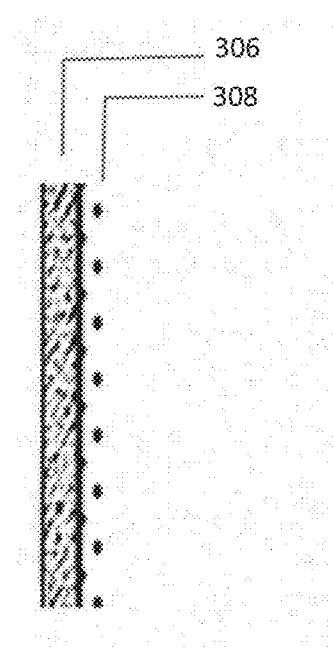
FIG. 3C is a cross section through two material layers.

Inside the shroud, layers of sound absorbing materials are provided. These layers may be repeating. Any suitable combination of materials may be used. In one embodiment, the layers comprise a first layer of nanofiber 306 (which may be closest to the interior facing layer 108), and a second layer of melamine 308. These layers may be repeated. The nanofiber layer may be between 200-300 microns thick. The melamine layer may be about 2 cm thick. FIGS. 3A to 3C show adjacent layers of nanofiber 306 (as indicated by the dotted hatching) and melamine 308 (as indicated by the diagonal hatching) (not to scale).

Layering Different Materials

Providing layers of two or more materials inside the shroud may provide improvements in sound absorption over using a single material. Different materials absorb different frequencies of sound with varying effectiveness. Such differences are related to the properties of the material, which may include fibre size, airflow resistance, thickness, porosity, tortuosity and density. An explanation of the possible effect/s of different material properties is provided below:

Fibre Size:

The sound absorption coefficient of a fibrous material increases as fibre diameter decreases, because thin fibres are able to move more easily than thick fibres in response to sound waves. Moreover, with fine denier fibres, more fibres are required to reach the same volume density which results in more tortuous paths and higher airflow resistance.

Airflow Resistance:

The specific airflow resistance per unit thickness of material strongly influences the sound absorbing characteristics of the material (including the characteristic acoustic impedance and propagation constant). Fibres interlocking in nonwovens are the frictional elements that provide resistance to acoustic wave motion. When sound enters such materials, the amplitude of the sound is decreased by friction as the waves attempt to move through tortuous passages, and acoustic energy is converted into heat.

Thickness:

The thicker the material the better the sound absorption. The importance of thickness on low frequency sound absorption is based on the principle that low frequency means longer wavelength and longer wavelength sound can be absorbed if the material is thicker.

Porosity:

The number, size and type of pores also affect sound absorption. The porosity of a material should enable sound to pass through and get dampened. The porosity of a porous material is defined as the ratio of the volume of the voids in the material to its total volume. For a nonwoven web to have a high sound absorption coefficient, porosity should increase along the propagation of the sound wave.

Tortuosity:

Tortuosity is a measure of the elongation of the passageway through the pores, compared to the thickness of the sample. Tortuosity quantifies the influence of the internal structure of a material on its acoustic properties. Tortuosity mainly affects the location of the quarter-wavelength peaks, whereas porosity and airflow resistance affect the height and width of the peaks.

Density:

The cost and weight of an acoustic material is directly related to its density. There is an increase of sound absorption in the middle and higher frequencies as density increases. Energy loss increases as the surface friction increases, thus the sound absorption coefficient increases. In nonwoven fibrous materials less dense and more open structures absorb sound of low frequencies (~500 Hz), whereas denser structures perform better for frequencies above 2000 Hz.

The spacing between layers may impact the sound absorption performance. Packing layers too tightly may degrade the performance.

There may be air gaps or small resonance chambers formed inside the shroud outer layer by virtue of the nature of the materials. Layers may be attached to one another in several ways, including adhesives, ultrasonic welding, sonic welding/spacing, and/or sewing/threading.

Figure 3D:
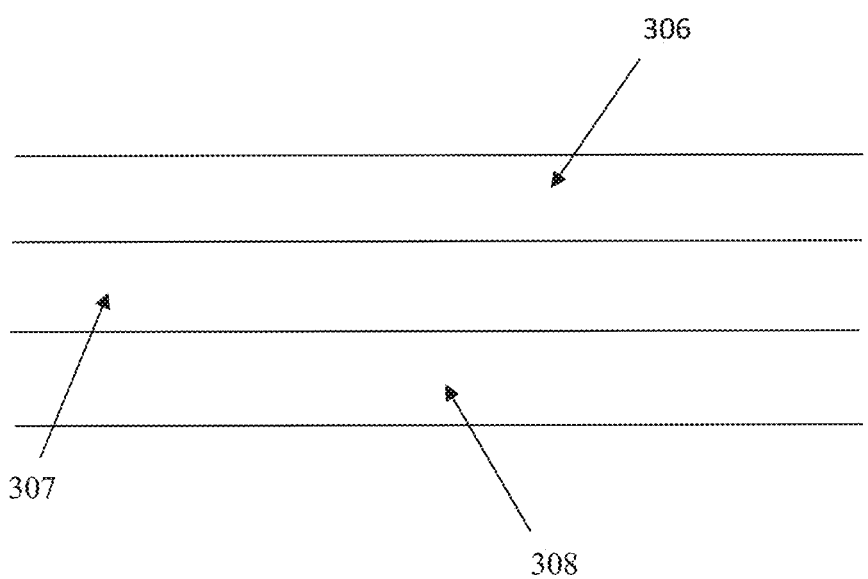
FIG. 3D is a line drawing of three layers including two material layers and an air gap.

In some embodiments, there may be air gaps between layers or within layers. For example, in FIG. 3D the first material 306 may be a thin layer in front of an air gap 307. The distance of the interior-most facing layer of the material 306 from the exterior facing layer 308 of the outer layer may affect the acoustic performance of the material, almost as much as the thickness of the material itself. For example, a 10 mm melamine 306 with a 15 mm air gap 307 may perform almost as well as 25 mm of melamine. Gaps 307 may be included within middle layers.

In some embodiments, one of the layers may be a sound dampening adhesive (or a "damping patch"). For example, a layer may be an add-on patch Constrained Layer Damping (CLD) treatment used to reduce vibration on vibrating structures. One example is Roush's Dynadamp™ material, which is a thin damping treatment used in CLDs.

First Material

The first material may be a thin, lightweight material such as nanofiber. The nanofiber may be made of poly(methyl methacrylate) (PMMA), thermoplastic polyurethane (TPU), a composite of both PMMA and TPU, or other suitable material(s). Other thin materials or fibre sheets may be used. The inclusion of nanofiber increases the noise absorption coefficient at lower frequencies. The first material may include micro-particle additives which may further increase the absorption coefficient at certain frequencies. For example, the first material may be a nanofiber with aerogel particles added within the nanofiber. Other possible additives include glass beads or TPU.

Providing a material with low acoustic impedance (such as nanofiber) closest to the interior facing layer of the shroud is beneficial because it changes the acoustic impedance of the first layer of the layers inside the shroud so that it more closely matches the acoustic impedance of air, allowing a higher transmission of sound into the inside of the shroud. Acoustic impedance is a measure of how much acoustic flow there is when acoustic pressure is applied. If the acoustic impedance of the first layer is close to the acoustic impedance of air (e.g. generally fibrous/open-cell porous materials, like nanofiber), then most of the sound gets transmitted inside of the shroud. If the acoustic impedance of the first layer is not close to the acoustic impedance of air (e.g. concrete), then most of the sound is reflected.

Second Material

The second material may be bulk lightweight sound absorbing material. The material may be a melamine foam, a cotton-fibre-nanofiber mixture, Rockwool, cork, rubber, a polymeric foam, felt, glass wool, cotton fibre, or a packing foam.

High density mineral fibres such as Rockwool have good sound absorption properties, however they also have higher weight which reduces the efficiency and performance of the UAV. A trade-off may be made between the weight of the material and its noise absorption properties. Preferably the weight of the material is minimised relative to its noise absorption properties. The material used may depend on the size of a shroud. In small shrouds, better absorbing material may not be worth the extra weight, but due to scaling, extra weight may be insignificant in larger shrouds.

Use of two repeating layers is only one example of possible configurations of sound absorbing material inside a shroud. However, any two or more acoustic materials may be used inside a shroud. Up to five different materials may be used to optimise noise reduction of the shroud. The number of layers of material inside a shroud may vary. In some embodiments, the shroud may include up to ten layers. In some embodiments, non-repeating layers of materials may be included. For example, five layers of different materials may be included inside a shroud.

Test Results

Figures 9, 10:
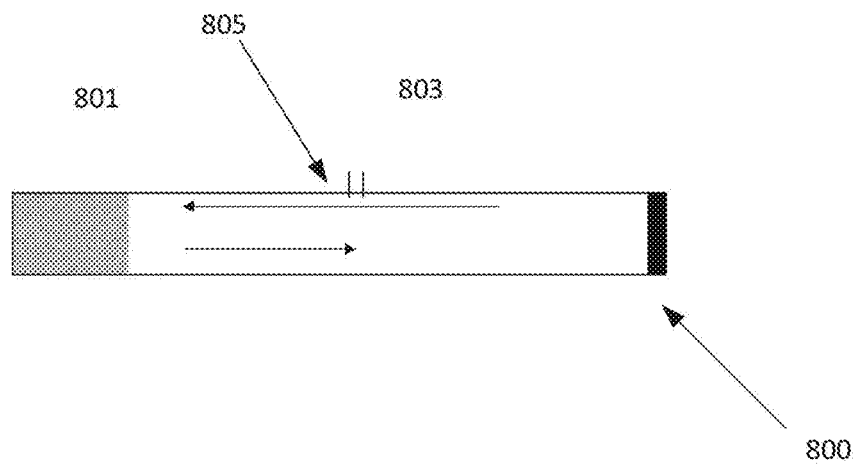
FIG. 9 is a representation of material testing equipment.
FIG. 10 is a table showing weights of various materials.

Different materials were tested for their noise-absorption properties. FIG. 9 shows a test apparatus for testing the noise-absorption properties of various materials. The materials 801 were placed at the end of an impedance tube 800, speakers 807 emitted noise into the impudence tube 800, and microphones 805 and 803 measured the sound at two different locations, in order to calculate the absorption coefficient of each material. FIG. 10 is a table showing material weights (measured in $g/m^2$ or gsm) of various materials which were tested. Ideal materials for noise-reducing shrouds have relatively low weight and relatively high acoustic performance i.e. a high absorption coefficient. Cork-rubber, for example, at a weight of 3455 $g/m^2$ is heavy considering its acoustic performance.

FIGS. 11A-E are graphs showing the performance of tested materials, according to the following key:

| Reference | Material |
|---|---|
| 901 | HVAC |
| 902 | 30 mm melamine |
| 903 | 42 mm Rockwool |
| 904 | 35 mm Glasswool |
| 905 | 5 mm cork-rubber |
| 906 | 13.5 mm packing foam |
| 907 | 1.3 mm stiff felt |
| 908 | 0.7 mm felt with epoxy |
| 909 | 24 mm nexus foam |
| 910 | cotton with epoxy |
| 911 | 1.8 gsm PPMA control nanofiber facing with 24 mm nexus foam backing |
| 912 | 1.2 gsm PPMA + 20% Ag nanofiber facing with 24 mm nexus foam backing |
| 913 | 1.0 gsm PPMA + 30% Ag nanofiber facing with 24 mm nexus foam backing |
| 914 | Phonix nanofiber facing with 24 mm nexus foam backing |
| 915 | 13.6 gsm + 20% tungsten nanofiber facing with 24 mm nexus foam backing |
| 916 | 5.3 gsm graphene nanofiber facing with 24 mm nexus foam backing |
| 917 | 3 gsm graphene nanofiber facing with 24 mm nexus foam backing |
| 918 | Nanofiber fabric facing with 24 mm nexus foam backing |
| 919 | Cork-rubber + cotton fibre facing |
| 920 | Cork (non-rubber) + cotton fibre facing |
| 921 | Felt + cotton facing |
| 922 | Cork + felt + cotton facing |
| 923 | Cotton + felt + cork facing |

| Reference | Material |
| --- | --- |
| 924 | Cotton with 30% Ag in front and 0.8 mm PLA with 1 mm radially spaced holes |
| 925 | Cotton with 20% Tungsten in front and 0.8 mm PLA with 1 mm radially spaced holes |
| 926 | Cotton with PMMA nanofiber control in front and 0.8 mm PLA with 1 mm radially spaced holes |
| 927 | Cotton with 5.3 gsm graphene in front and 0.8 mm PLA with 1 mm radially spaced holes |
| 928 | Nexus foam with 1 mm radial holes PLA plate |
| 929 | Nexus foam with cotton facing |
| 930 | Nexus foam with cotton facing and Phonix inbetween |
| 931 | Nexus foam with cotton facing and Phonix inbetween. 0.8 mm PLA 1 mm radially spaced holes facing |
| 932 | Nexus foam with HVAC gauze facing |
| 933 | Nexus foam with 0.8 mm PLA sheet 1 mm holes spaced rectangularly |

Figure 11A:
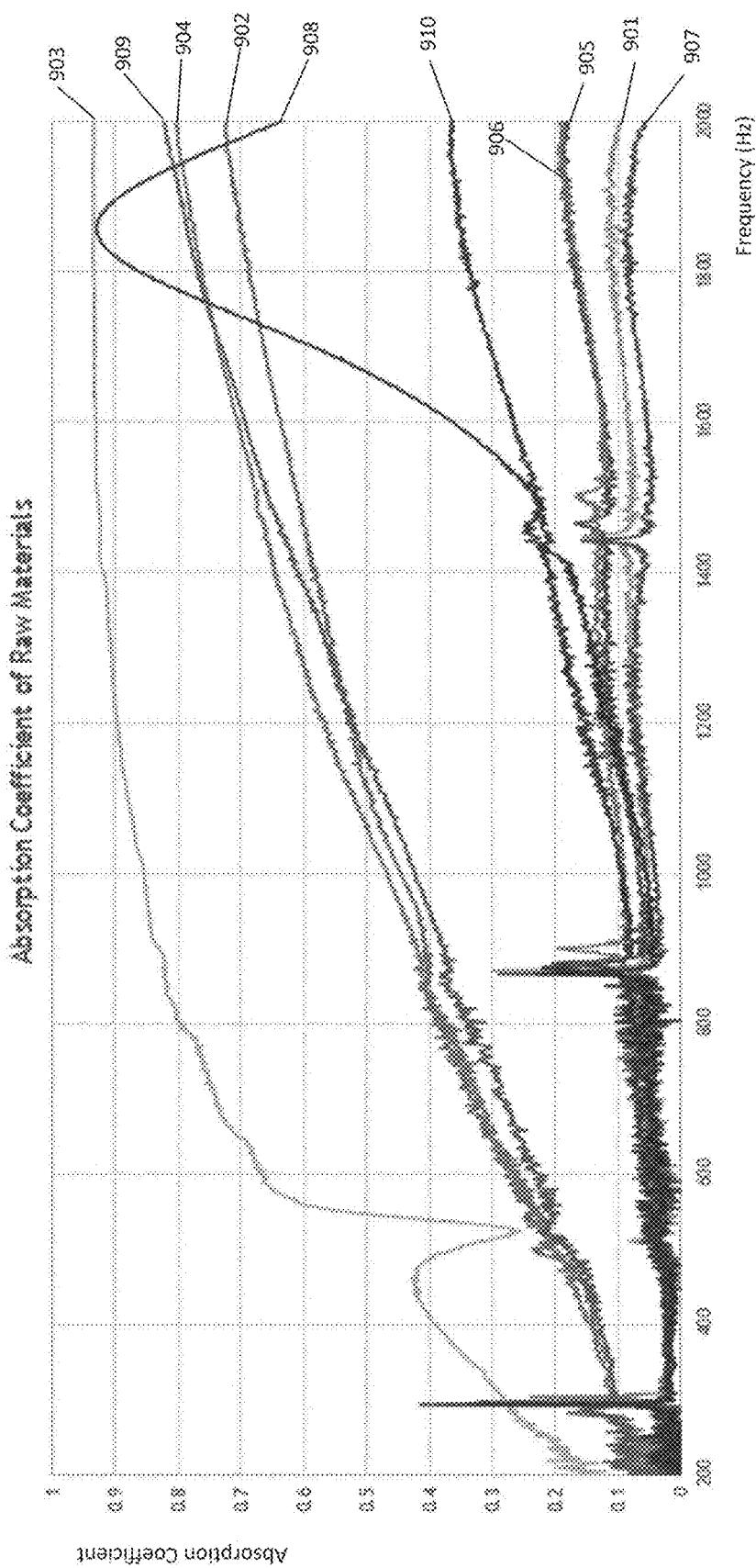
FIGS. 11A-E are graphs showing the acoustic performance of various materials.

FIG. 11A shows the absorption coefficient of various raw materials for a range of frequencies. The graph shows that Rockwool has the best performance (however as shown in FIG. 10, it also has a relatively high weight). Melamine is shown to perform well, particularly considering its relatively low weight.

Figure 11B:
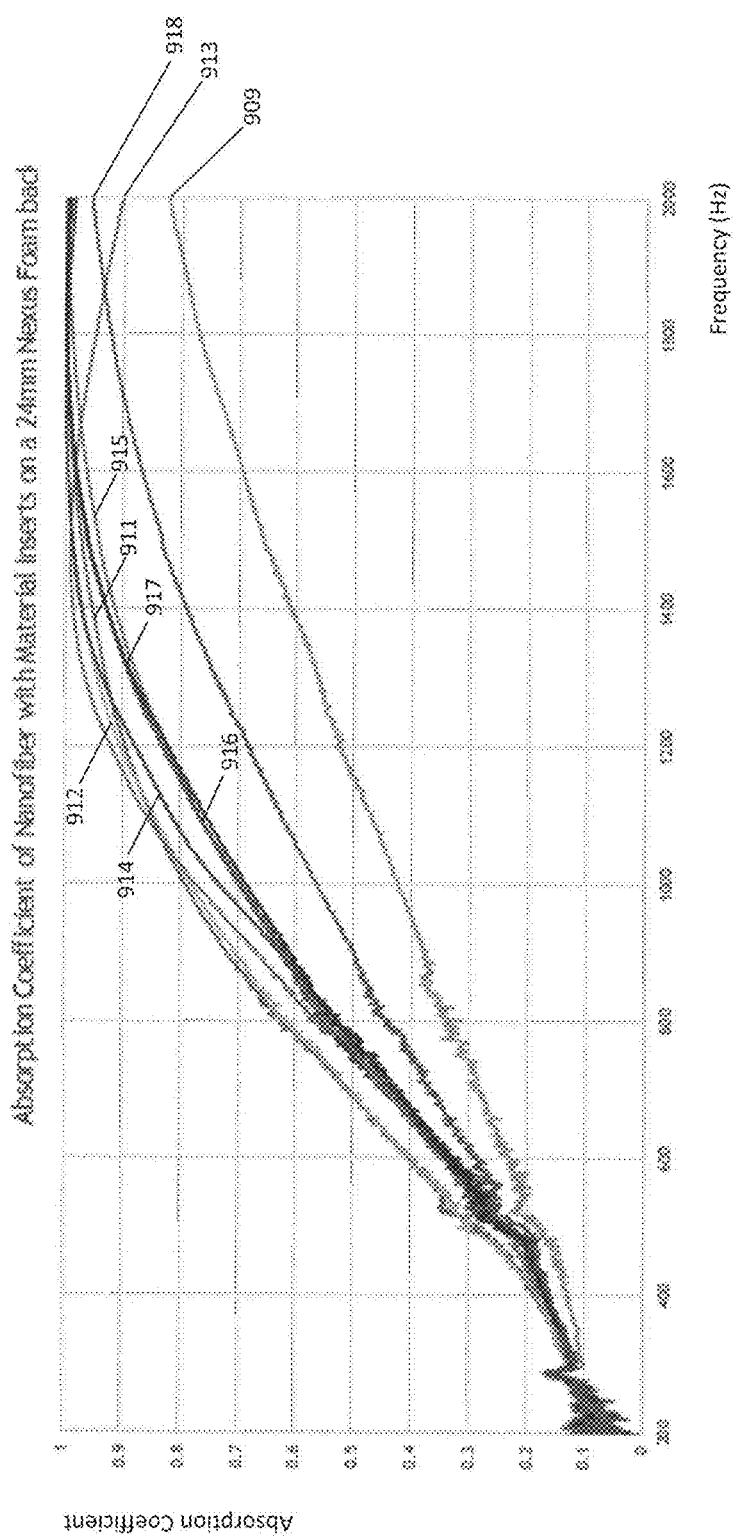

FIG. 11B shows the absorption coefficient of nanofiber with various material additives on a 24 mm a polyurethane foam backing (for example, nexus foam) for a range of frequencies.

Figure 11C:
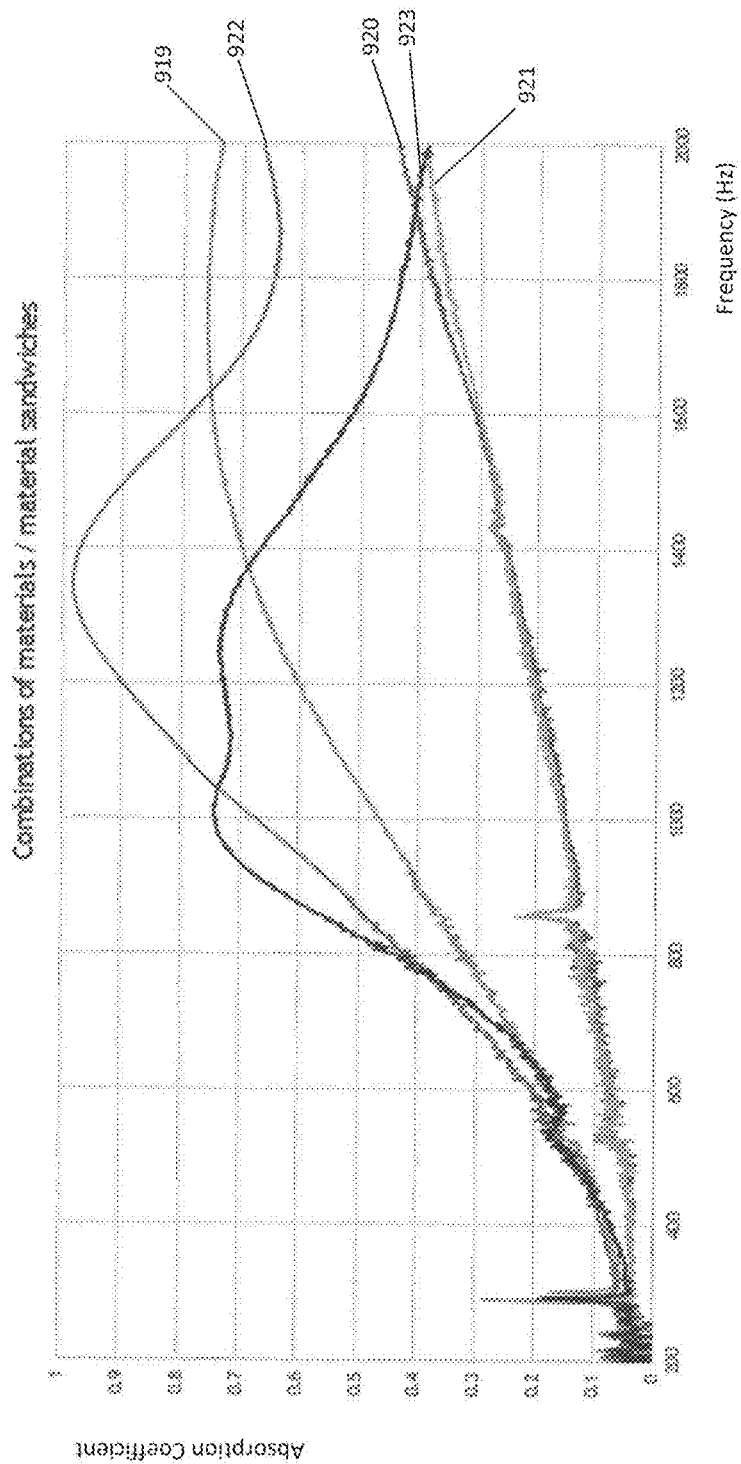

FIG. 11C shows the absorption coefficient of various combinations of materials for a range of frequencies. It shows different relationships between absorption coefficient and frequency due to the interactions of sound as it encounters different acoustic impedances of the materials. However, the combinations may not be suitable for fairly constant broadband noise from 1 kHz upwards.

Figure 11D:
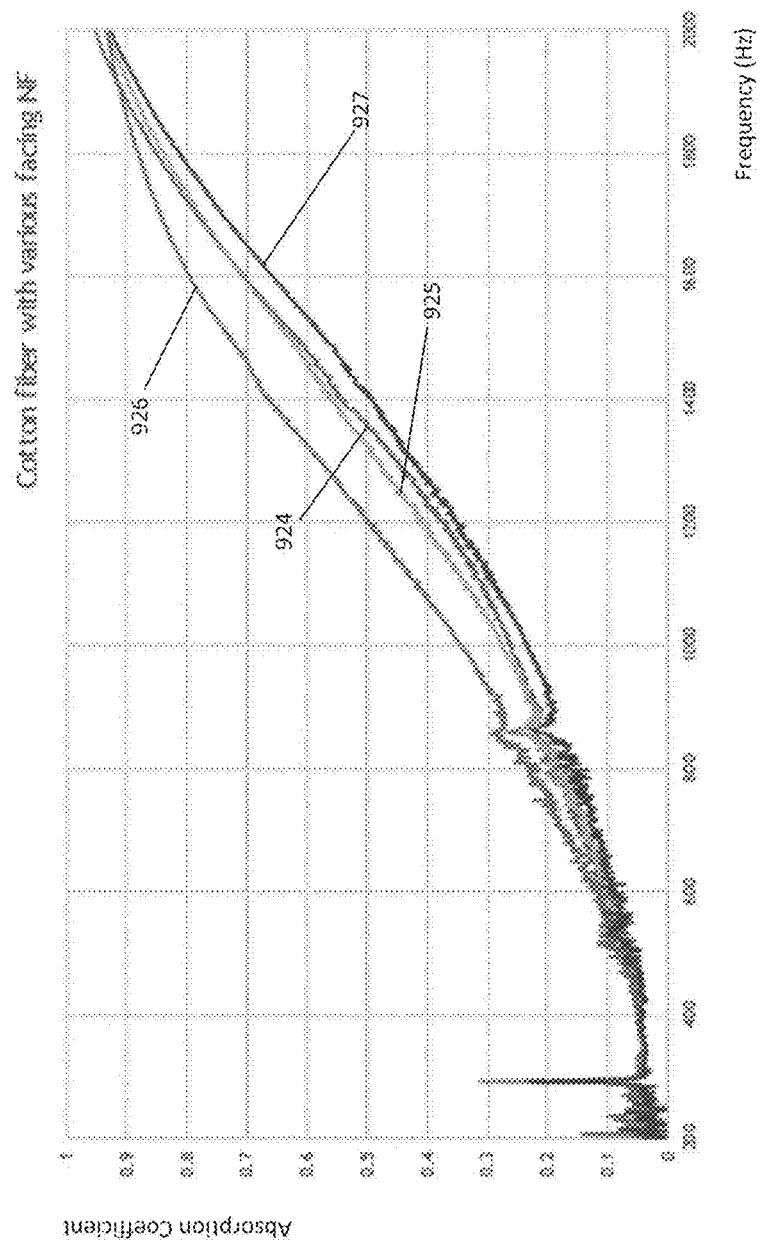

FIG. 11D shows test results of cotton fibre with facing nanofiber with various material additive. All combinations have a polylactic acid (PLA) plate on their face and a cotton fibre backing. The PLA plate includes apertures spaced apart by 1 mm.

Figure 11E:
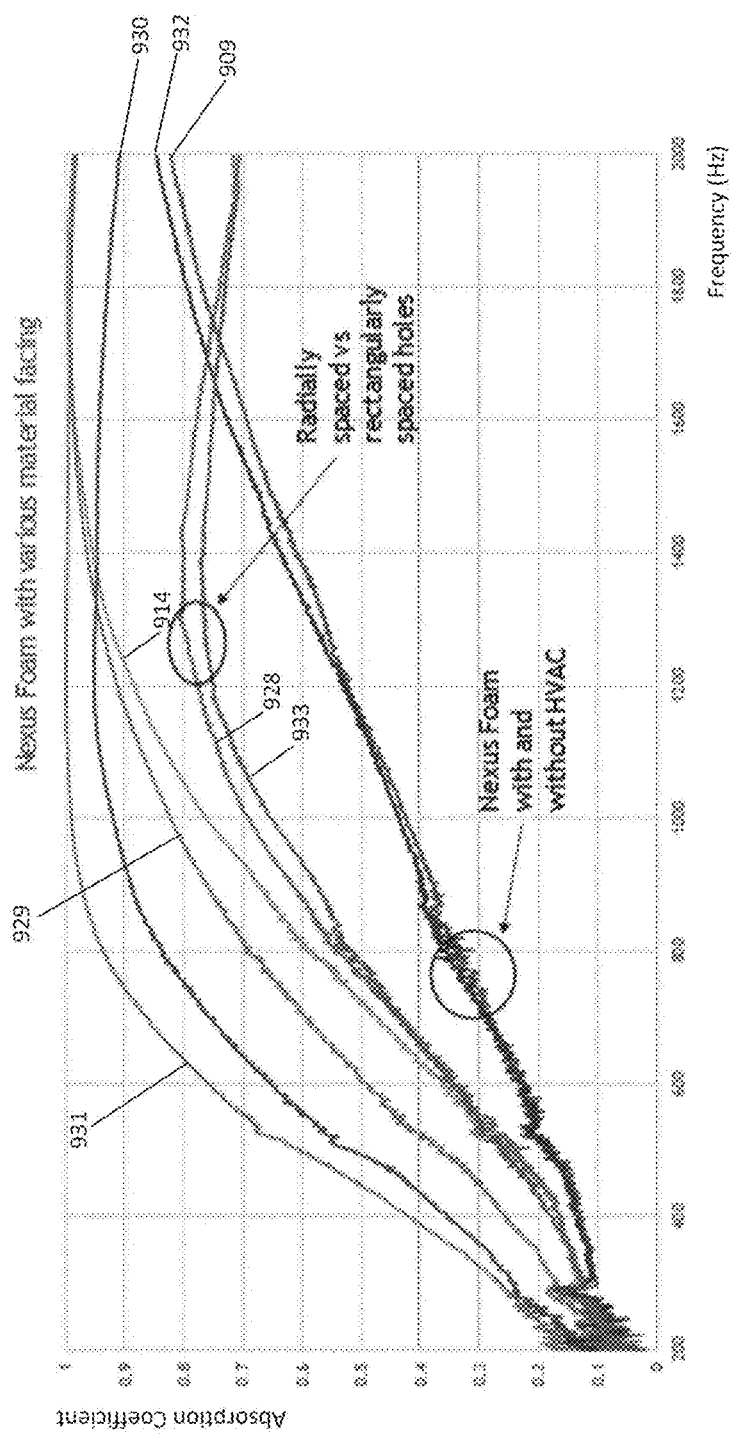

FIG. 11E shows the absorption coefficient of a nexus foam with various facing materials for a range of frequencies. All combinations have a nexus foam backing.

Shroud Outer Layer

Material

The outer layer of the shroud may comprise any suitable material that is lightweight and rigid. Examples include carbon fibre, fibreglass, titanium, plastic or aluminium. Preferably the material has minimal thickness while maintaining sufficient strength.

The outer layer provides structural rigidity and keeps the layers of material inside the shroud safe from the environment, and maintains the materials a safe and uniform distance away from the tips of the blades of the propeller.

The outer layer may be made from an acoustically reflective material. Having the interior facing layer made of an acoustically reflective material may cause noise from the noise source to be reflected back into the interior. The shroud may be shaped such that most of the noise is reflected generally upwards out of the top of the shroud. While this does not help absorb the noise, it effectively redirects it away from the ground reducing the noise that may be detected elsewhere (for example, by a user on the ground). Further, having the exterior facing layer made of an acoustically reflective material may cause noise that has been transmitted into the inside of the shroud to be reflected back inside the shroud. This reduces the noise escaping from the shroud. It also increases the distance noise travels inside the shroud, increasing the noise absorbed by the sound absorbing materials.

In one embodiment, the outer layer may comprise a distinct interior facing layer and a distinct exterior facing layer. The interior facing layer and exterior facing layer may be connected together by a suitable join or seal, thereby completing a shell that encloses the sound absorbing materials inside the shroud. The join or seal may be made of a material that acoustically isolates the interior facing layer from the external facing layer. For example, the join or seal may be made of thermoplastic polyurethane (TPU.)

The interior facing layer and the exterior facing layer may be made of the same material. By keeping each layer distinct it limits sound vibrations in the interior facing layer being transmitted directly to the exterior facing layer. Vibrations in the exterior facing layer may be undesirable as such vibrations may cause the exterior facing layer to act as a speaker.

Figure 4A:
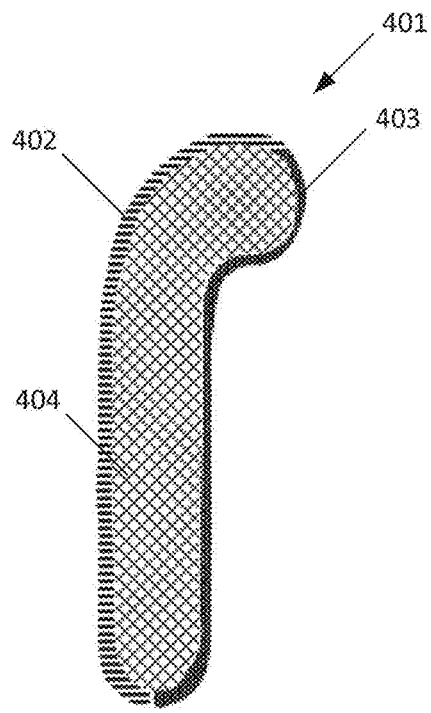
FIGS. 4A-B are cross sectional outlines of shroud profiles.
Figure 4B:
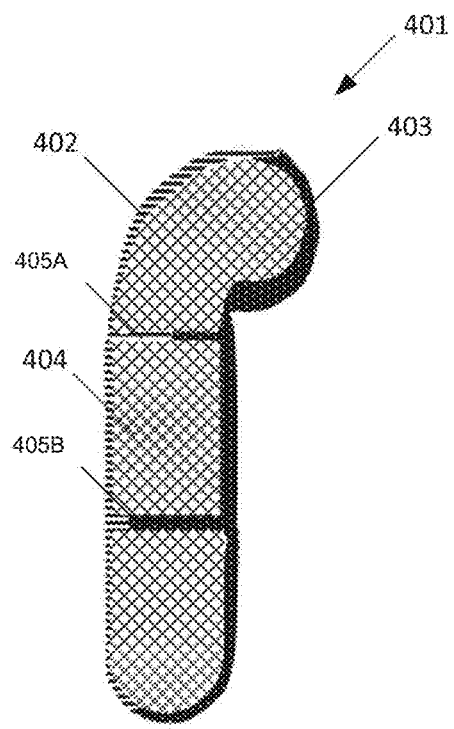

The interior facing layer and the exterior facing layer may be made of different materials. For example, the interior facing layer may be made of a material with low acoustic impedance, permitting more noise from the noise source to be transmitted to the inside of the shroud where it will be absorbed by the sound absorbing materials. The exterior facing layer may be made of a material with high acoustic reflectivity, maximizing the noise that is reflected back to the sound absorbing materials inside the shroud. FIGS. 4A-4B are profiles of shrouds corresponding to different configurations of the outer layer. In each figure, the left hand side of the profile corresponds to the interior of the shroud. FIG. 4A shows a profile of a shroud 401 where the interior facing layer 402 is made of one material (indicated by the horizontal hatching) and the exterior facing layer 403 is made from another material (indicated by dark hatching). The shroud 401 includes sound absorbing material or materials 404 (indicated by criss-cross hatching). FIG. 4B shows a profile of a shroud 401 in which the interior facing layer 402 and exterior facing layer 403 are connected through the inside of the shroud 401 by protrusions 405A 405B. The protrusions may be connected by a sound isolating join (not shown).

Apertures

The interior facing layer 108 of the outer layer may be perforated such as to allow sound to transmit into the inside of the shroud. The interior facing layer 108 of the shroud may include a number of apertures that allow the sound to transmit through to the layers of material inside the shroud. The apertures may cover the majority of the interior facing layer 108, or only part of the interior facing layer 108 which is exposed to noise from the propeller.

The apertures may have a diameter of between 0.1 mm to 2 mm in diameter (preferably 0.5 mm). Larger diameters may result in thrust efficiency losses as well as exposure of the layers of material inside the shroud to the external environment (for example, water or dirt). Lower diameters may be more expensive/time consuming to manufacture.

Between 20% and 40% of the interior facing layer of the shroud may be perforated. The perforated area should be optimised not to compromise the rigidity of the outer layer.

As the apertures cover the majority of the interior facing layer, sound from not just the tips of the propellers, but most of the sound produced by the propellers is absorbed into the shroud. In some embodiments, the apertures may be omitted from the region of interior facing layer adjacent to the tips of the blades of the propeller.

Figure 5:
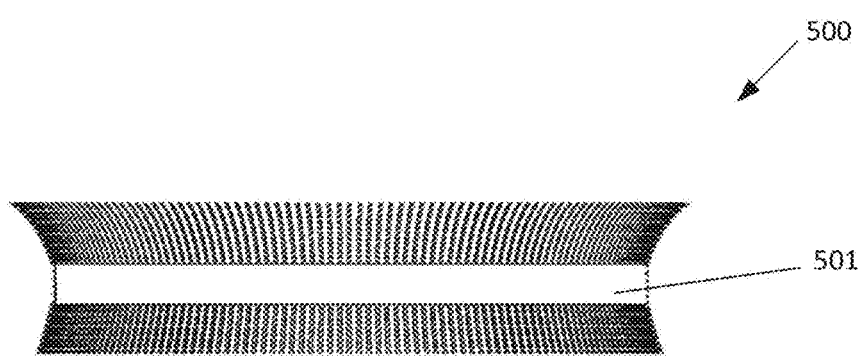
FIG. 5 is a cross sectional view of an interior facing layer according to one example embodiment.

FIG. 5 shows a cross-sectional view of an interior facing layer 500, corresponding to the cross-sectional view of FIG. 1B. The interior facing layer 500 includes a band 501 without apertures. The band 501 corresponds to the region of the interior facing layer 500 adjacent to the tips of the propeller (not shown). The remainder of the interior facing layer 500 is perforated.

In the embodiment shown in FIGS. 3A and 5, the apertures are generally circular. FIGS. 6A to 6F show various other possible aperture shapes. As non-limiting examples, the apertures may be may be circular (6A), square (6B), triangular (6C), slot-shaped (6D), hexagonal (6E), diamond (6F) or any other suitable shape.

The exterior facing layer of the shroud may omit apertures. This may help the exterior facing layer be sound impervious.

The apertures may be formed in any suitable manner. The outer layer of the shroud may be 3D printed to include apertures. In other embodiments, the apertures may be laser cut, CNC/drilled, injection moulded, or punched out.

Shroud Geometry

Size

The interior diameter of the shroud may be between 1 inch to 50 inches. In some embodiments, the interior diameter may be between 1 inch to 32 inches. The shroud height may similarly be between 1 inch to 50 inches (and in some embodiments, 32 inches), and may match the respective interior diameter. The shroud height may be sufficient to envelope and reduce noise from multi-bladed propellers. Noise from the motor and vertical lift propeller assembly radiates in generally all directions, so having a shroud height such that the shroud extends further above the propeller and lower below the propeller will allow the shroud to absorb/reflect more noise. However this also increases the weight and bulk of the shroud which may affect UAV aerodynamics and efficiency. The shroud height should be optimised with respect to the UAV efficiency and noise reduction required in any particular application. The thickness of the shroud (i.e. the distance between the interior facing layer and the exterior facing layer) may be about 4 inches. The thickness should be optimised with respect to the UAV efficiency and noise reduction required in any application.

The interior diameter may be smaller at the bottom of the shroud compared to the top. This may help duct airflow improving the thrust of the UAV. The interior diameter of the shroud above the propeller may be larger than the diameter of the propeller. This may help allow reflected sound to exit generally upwards out of the shroud. The interior diameter of the shroud below the propeller may be generally smaller than the diameter of the propeller. This may help limit reflected sound exiting generally downwards out of the shroud.

Cross Section of Shroud (Overall Shroud Shape)

In addition to providing means for sound absorption (such as the layers of sound absorbing material, described above), the shroud may be shaped to reflect sound to reduce noise. As previously mentioned, the outer layer may be made of an acoustically reflective material. Even if the shroud, or parts of the shroud, is not made of acoustically reflective material, most materials will reflect some sound to a lesser or greater extent so it is important to consider the effect the shroud has on reflected noise.

Figure 7A:
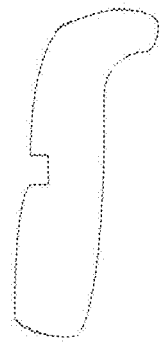
FIGS. 7A-E are cross sectional outlines of shrouds having different shroud shapes.

One setback of merely shrouding a UAV propeller is that there may be an increase in broadband noise. The shape of the shroud may reduce broadband noise. FIGS. 7A-7D are profiles of shrouds corresponding to different shroud shapes. In each figure, the left hand side of the profile corresponds to the interior of the shroud. FIG. 7A shows a bell-mouth shaped profile, which may result in a large reduction of broadband noise. The bell-mouth shape is also shown in FIGS. 1A to 2. Bell-mouth inlets are used in aerospace as a way of gaining more thrust, which also has the side effect of decreasing noise. Increasing the thrust efficiency of the shroud through different parameters seems to result in less noise by consequence.

Figure 7B:
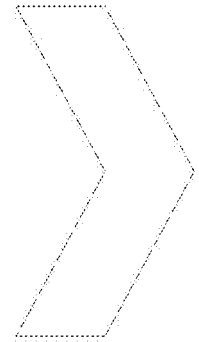

FIG. 7B shows a shroud profile with a substantially v-shaped cross section, allowing a propeller of an aircraft (not shown) to extend inwards towards the internal corner of the v.

Figure 7C:

FIG. 7C shows a shroud profile without any recess.

Figure 7D:
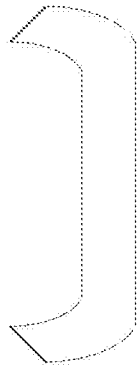

FIG. 7D shows a shroud profile with the top and bottom edges curved inwards towards the interior of the shroud.

Figure 7E:
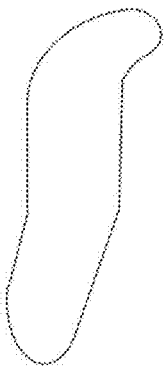

FIG. 7E shows a shroud profile where the interior diameter at the top is larger than the diameter of the propeller and the interior diameter at the bottom is smaller than the diameter of the propeller. The region of the interior facing layer above the propeller is shaped so that noise emanating from the propellers will reflect in a generally inwards and upwards direction (except for noise that is transmitted through the interior facing layer). The tapering of the region below the propeller means that more noise is reflected generally inwards and upwards (except for noise that is transmitted through the interior facing layer).

Cross Section of Recess

The interior facing layer surface of the shroud may include a recess which allows the propeller blade tip to be located inside the recess. This recess minimizes the formation of tip vortices which create noise. The recess may include apertures which allow the noise to pass through into the inside of the shroud. In some embodiments, the recess may omit apertures to reduce airflow passing through into the inside of the shroud. The shroud may include or omit a recess.

The shape and/or configuration of the recesses may alter the flow of the air over the blade and therefore the resulting noise.

FIGS. 8A to 8E show shroud profiles having various possible recess configurations. In each figure, the left hand side of the profile corresponds to the interior of the shroud. FIG. 8A shows a substantially rectangular shaped recess, as shown also in FIGS. 2 and 3A. FIG. 8B shows a triangular shaped recess. FIG. 8C shows an ovular shaped recess. FIG. 8D shows the interior facing layer of the shroud smoothly curved such as to form a recess generally halfway between the top and the bottom of the shroud.

In other embodiments, one or more recesses may be configured to be used with different propeller structures. For example, a UAV with multiple propellers may include a shroud with multiple recesses, one for each propeller. Double-propped UAV shrouds may include two recesses. FIG. 8E shows a shroud profile with two recesses for a double-propped UAV. In this example, the recesses are both ovular shaped.

The recess depth (at its deepest point) may be up to 10% of the propeller radius. The recess depth is the depth in the horizontal plane, as illustrated by way of example in FIG. 8A by arrow D.

Position of Shroud Relative to Propellers

To optimise noise reduction, preferably the distance between the interior facing layer of the shroud and the propellers is reduced. In one embodiment, a 3D printed shroud is configured to surround a propeller with a clearance radius of about 0.5 mm between the tip of the blades of the propeller and the interior facing layer/recess.

In terms of placement, the recess may be positioned immediately after the inlet geometry (for example the bell-mouth shaped inlet).

Method of Manufacture

The shroud and/or components of the shroud may be manufactured by any suitable method, including:

Injection moulding;
Sand casting;
Layered fabrication;
3D printing; and/or
CNC manufacturing.

In one embodiment, the outer layer is formed as a rigid carbon fibre shell, and layers of material may be pushed into the shell, which spring into place to fill any gaps. Acoustic foams are springy, so if they are compressed slightly as they are inserted, they spring and conform to the shape of their container. Nanofiber is flexible and thin so it may be attached to the foam layer before insertion.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A shroud for an unmanned aerial vehicle configured to at least partially surround a noise source including a propeller, the shroud including two or more sound absorbing materials located inside the shroud, wherein the two or more materials includes a first material and second material, wherein the first material is one of a fibrous material or an open-cell porous material, wherein the propeller is not part of a jet engine, and wherein the shroud is shaped to reflect noise from the propeller in a generally inwards and upwards direction.

2. The shroud as claimed in claim 1, wherein the first material is one of nanofiber or melamine foam.

3. The shroud as claimed in claim 1, wherein the first material includes an additive substance, wherein the additive substance is configured to improve the sound absorbing of the first material, or the additive substance is aerogel particles, TPU particles or glass beads.

4. The shroud as claimed in claim 1, wherein the second material is one of a fibrous material, an open-cell porous material, melamine foam or nanofiber.

5. The shroud as claimed in claim 1, wherein a first layer of the first material has a thickness between 200 microns to 300 microns.

6. The shroud as claimed in claim 1, wherein a second layer of the second material has a thickness between 15 mm to 35 mm.

7. The shroud as claimed in claim 5, wherein the first layer is closer to the noise source than the second layer.

8. The shroud as claimed in claim 5, wherein an air gap is provided between the first material and the second material.

9. The shroud as claimed in claim 1, wherein the two or more sound absorbing materials substantially fill the shroud.

10. The shroud as claimed in claim 1, further including an outer layer having a recess, wherein the recess is located and sized to partially surround at least a part of a tip of a blade of the propeller.

11. The shroud as claimed in claim 1, further including an outer layer configured to transmit noise from the noise source into the inside of the shroud.

12. The shroud as claimed in claim 11, wherein the outer layer includes apertures.

13. The shroud as claimed in claim 1, wherein the shroud includes a layer of sound dampening adhesive.

14. The shroud as claimed in claim 1, wherein at least part of the shroud is bell-mouth shaped.

15. The shroud as claimed in claim 1, wherein the propeller is a vertical lift propeller.

16. A shroud for an unmanned aerial vehicle configured to at least partially surround a noise source including a propeller having at least one blade, the shroud including an outer layer having a recess, wherein the recess is located and sized to partially surround at least a part of a tip of the at least one blade, wherein the propeller is not part of a jet engine, and wherein the shroud is substantially annular.

17. The shroud of claim 1, further comprising:

at least one propeller assembled within the shroud into an unmanned aerial vehicle.

18. The shroud as claimed in claim 1, wherein at least one of the two or more sound absorbing materials located inside the shroud has an absorption coefficient greater than 0.3 in the frequency range of 800-1400 Hz.

19. The shroud as claimed in claim 18, wherein the at least one of the two or more sound absorbing materials located inside the shroud has a material weight less than 1000 $g/m^2$.

20. The shroud as claimed in claim 1, wherein the shroud is substantially annular.

* * * * *